Patented Jan. 27, 1953

2,626,960

UNITED STATES PATENT OFFICE 2,626,960

1,4-DIOXO-5-(NITROPHENYL)-1,4,4a,5,8,8a-HEXAHYDRO-NAPHTHALENES

Moses Wolf Goldberg, Upper Montclair, and William Edwin Scott, Essex Fells, N. J., assignors to Hoffmann-La Roche Inc., Nutley, N. J., a corporation of New Jersey No Drawing. Application April 5, 1950, Serial No. 154,204

1 Claim. (Cl. 260—590)

This invention relates to new compounds, and more particularly to 1,4-dioxo-5-(nitrophenyl)-1,4,4a,5,8,8a-hexahydro-naphthalenes represented by the following formula:

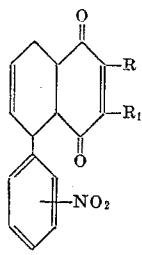

wherein R and $R_1$ stand for hydrogen, lower alkyl, or halogen radicals, R and $R_1$ not necessarily being identical. Compounds of the present invention are useful for pharmaceutical purposes, more particularly as amebicidal and antifungal agents.

The 1,4-dioxo-5-(nitrophenyl)-1,4,4a,5,8,8a-hexahydro-naphthalenes can be readily prepared by condensing a 1-nitrophenyl-1,3-butadiene with a 1,4-benzoquinone.

The 1-nitrophenyl-1,3-butadienes employed as intermediates in the synthesis can in general be prepared by condensing an o-, m-, or p-nitrophenyl diazonium chloride with a 1,3-butadiene to form a 1-(o-, m-, or p-nitrophenyl)-4-chloro-2-butene, and dehydrohalogenating the latter to form a 1-(o-, m-, or p-nitrophenyl)-1,3-butadiene 1-p-Nitrophenyl-1,3-butadiene is a known compound. The following examples will serve to illustrate the preparation of other 1-nitrophenyl-1,3-butadienes employed in the synthesis.

EXAMPLE A

1-(o-nitrophenyl)-1,3-butadiene 70 grams of o-nitraniline, 140 cc. of concentrated (35%) hydrochloric acid and 50 cc. of water were heated to boiling. The solution was then cooled with stirring to 0° C. After addition of 50 grams of ice, the o-nitraniline was diazotized with a solution of 35 grams of sodium nitrite in 60 cc. of water. The solution containing the o-nitrophenyl diazonium chloride which had formed was then added dropwise over 90 minutes to a stirred mixture of 500 cc. of acetone, 15 grams of cupric chloride in 25 cc. of water, 40 grams of sodium acetate in 50 cc. of water, and 65 cc. of liquid 1,3-butadiene. During the addition, the temperature of the reaction was kept at —3° to +5° C. The mixture was then stirred for 16 hours at 25° C. After extraction with 500 cc. of ether, the aqueous layer was discarded, the ether extract washed with water, dried and the ether removed in vacuo. The crude 1-(o-nitrophenyl)-4-chloro-2-butene thus obtained was dissolved in 190 cc. of methanol. To this solution there was added dropwise with stirring a solution of 40 grams of potassium hydroxide in 220 cc. of methanol. The reaction temperature was kept below 35° C. After standing at 25° C. for 16 hours, the mixture was filtered and the precipitate washed with water. On recrystallization once from methanol-water and once from ethanol, the 1-(o-nitrophenyl)-1,3-butadiene thus obtained melted at 70–71° C.

EXAMPLE B

1-(m-nitrophenyl)-1,3-butadiene 140 grams of m-nitraniline were stirred with 240 cc. of hot concentrated hydrochloric acid and 100 cc. of water. The solution was cooled to 0° C., 100 grams of ice were added, and the nitraniline diazotized with 70 grams of sodium nitrite in 120 cc. of water. The solution of the m-nitrophenyl diazonium chloride thus formed was filtered and added over 90 minutes to a stirred mixture of one litre of acetone, 80 grams of sodium acetate in 100 cc. of water, 30 grams of cupric chloride in 50 cc. of water, and 130 cc. of liquid 1,3-butadiene, the reaction mixture being maintained at —3° to +5° C. Stirring was continued for 16 hours at room temperature. The reaction mixture was then extracted with 1 litre of ether, the ether extract washed with water, dried, and the ether then removed in vacuo. The crude 1-(m-nitrophenyl)-4-chloro-2-butene thus obtained was distilled at 0.1 mm. To the distillate, dissolved in 300 cc. of methanol, was added a solution of 70 grams of potassium hydroxide in 400 cc. of methanol. The solution was heated to boiling and refluxed with stirring for 30 minutes. It was then cooled to room temperature, the mixture poured into 1500 cc. of water and filtered. The precipitate which formed was recrystallized twice from ethanol, yielding yellow crystals of 1-(m-nitrophenyl)-1,3-butadiene, M. P. 62–63° C.

The following examples will serve to illustrate the preparation of the 1,4-dioxo-5-(nitrophenyl)-1,4,4a,5,8,8a-hexahydro-naphthalenes.

EXAMPLE 1

1,4-dioxo-5-(o-nitrophenyl)-1,4,4a,5,8,8a-hexahydronaphthalene 15 grams of 1-(o-nitrophenyl)-1,3-butadiene and 9 grams of p-benzoquinone were dissolved in 37 cc. of acetone and let stand at room temperature for 48 hours. The acetone was then removed in vacuo and the residue crystallized from ethanol. After recrystallization from ethanol, the pale yellow 1,4-dioxo-5-(o-nitrophenyl)-1,4,4a,5,8,8a-hexahydronaphthalene thus obtained melted at 93–97° C.

EXAMPLE 2

*1,4-dioxo-5(m-nitrophenyl)-1,4,4a,5,8,8a-hexahydronaphthalene*

A solution of 10 grams of 1-(m-nitrophenyl)-1,3-butadiene and 6 grams of p-benzoquinone in 14 cc. of acetone was let stand at room temperature for 16 hours. The acetone was removed in vacuo and the solid residue suspended in ethanol and filtered. After two recrystallizations from benzene, the 1,4 - dioxo - 5 - (m - nitrophenyl) - 1,4,4a,5,8,8a - hexahydronaphthalene thus obtained melted at 120–124° C.

EXAMPLE 3

*1,4-dioxo-5-(p-nitrophenyl)-1,4,4a,5,8,8a-hexahydronaphthalene*

1339 grams of 1-(p-nitrophenyl)-1,3-butadiene and 1005 grams of p-benzoquinone were dissolved in 4 litres of warm acetone and the solution refluxed in a water bath for six hours. Crystallization took place while the solution was still hot. After cooling the solution, and standing at 5° C. for 16 hours, the crystals were filtered off and twice recrystallized from benzene. The 1,4-dioxo - 5 - (p - nitrophenyl) - 1,4,4a,5,8,8a - hexahydronaphthalene thus obtained melted at 170–174° C.

EXAMPLE 4

*1,4-dioxo-2(or 3)-methyl-5-(o-nitrophenyl)-1,4,4a,5,8,8a-hexahydronaphthalene*

A solution of 14.3 grams of 1-(o-nitrophenyl)-1,3-butadiene and 10 grams tolu-p-quinone in 25 cc. of benzene was heated in a closed vessel at 45° C. for 16 hours. The benzene was removed in vacuo, and the residue suspended in ethanol, filtered, and washed. After two recrystallizations from benzene-ethanol and one from acetone, the 1,4 - dioxo - 2(or 3) - methyl - 5 - (o - nitrophenyl) - 1,4,4a,5,8,8a - hexahydronaphthalene melted at 148–150° C.

EXAMPLE 5

*1,4-dioxo-2(or 3)-methyl-5-(p-nitrophenyl)-1,4,4a,5,8,8a-hexahydronaphthalene*

A solution of 10 grams of 1-(p-nitrophenyl)-1,3-butadiene and 7 grams of tolu-p-quinone in 25 cc. of acetone was heated to boiling and let stand at room temperature for 16 hours. The solvent was removed in vacuo and the solid residue recrystallized twice from ethanol. After recrystallization from acetone, the 1,4-dioxo-2(or 3)-methyl-5-(p-nitrophenyl)-1,4,4a,5,8,8a-hexahydronaphthalene melted at 175–177° C.

EXAMPLE 6

*1,4-dioxo-2,3-dimethyl-5-(o-nitrophenyl)-1,4,4a,5,8,8a-hexahydronaphthalene*

A solution 10 grams of 1-(o-nitrophenyl)-1,3-butadiene and 12.8 grams of 2,3-dimethyl-p-benzoquinone in 25 cc. of acetone was let stand at room temperature for 72 hours. The acetone was then removed in vacuo. The residue crystallized on trituration with petroleum ether containing 5% ethanol. The 1,4-dioxo-2,3-dimethyl-5 - (o - nitrophenyl) - 1,4,4a,5,8,8a - hexahydronaphthalene was recrystallized from ethanol, M. P. 110–114° C.

EXAMPLE 7

*1,4 - dioxo - 2(or 3) - methyl - 3(or 2) - chloro - 5 - (o - nitrophenyl) - 1,4,4a,5,8,8a - hexahydronaphthalene*

A solution of 15 grams of 1-(o-nitrophenyl)-1,3-butadiene and 12.6 grams of 2-methyl-3-chloro-benzoquinone in 26 cc. of acetone was let stand for 16 hours at room temperature. The acetone was removed in vacuo and the oily residue dissolved in 150 cc. of ethanol. Crystallization took place on scratching. After recrystallization from ethanol the 1,4-dioxo-2(or 3)-methyl - 3(or 2) - chloro - 5 - (o - nitrophenyl) - 1,4,4a,5,8,8a-hexahydronaphthalene thus formed melted at 106–110° C.

EXAMPLE 8

*1,4 - dioxo - 2(or 3) - methyl - 3(or 2) -chloro-5- (m - nitrophenyl) - 1,4,4a,5,8,8a - hexahydro - naphthalene*

A solution of 15 grams of 1-(m-nitrophenyl)-1,3-butadiene and 12.6 grams of 2-methyl-3-chloro-p-benzoquinone in 27 cc. of acetone was let stand for 16 hours at room temperature. After removal of the acetone in vacuo, the oily residue was dissolved in 75 cc. of ethanol and 5 cc. of acetone. The 1,4-dioxo-2(or 3)-methyl-3(or 2)-chloro-5-(m-nitrophenyl)-1,4,4a,5,8,8a - hexahydronaphthalene which crystallized from this mixture was recrystallized from ethanol, M. P. 115–122° C.

EXAMPLE 9

*1,4 - dioxo - 2(or 3) - methyl - 3(or 2) -chloro-5- (p - nitrophenyl) - 1,4,4a,5,8,8a - hexahydro - naphthalene*

A solution of 11.15 grams of 1-(p-nitrophenyl)-1,3-butadiene and 10 grams of 2-methyl-3-chloro-p-benzoquinone in 15 cc. of acetone was let stand at room temperature for 16 hours. The 1,4-dioxo-2(or 3) - methyl - 3(or 2) - chloro - 5 - (p - nitrophenyl) - 1,4,4a,5,8,8a - hexahydronaphthalene which had crystallized out from the reaction medium, was recrystallized from acetone-water, M. P. 163–166° C.

EXAMPLE 10

*1,4-dioxo-2,3-dichloro-5-(p-nitrophenyl)-1,4,4a,5,8,8a-hexahydronaphthalene*

A solution of 10 grams of 1-(p-nitrophenyl)-1,3-butadiene and 10 grams of 2,3-dichloro-p-benzoquinone in 50 cc. of benzene was let stand for 72 hours at room temperature. The crystals of 1,4 - dioxo - 2,3 - dichloro - 5 - (p - nitrophenyl) - 1,4,4a,5,8,8a - hexahydronaphthalene which separated were filtered off and recrystallized from benzene after treatment with charcoal. The compound melted at 190–193° C.

We claim:

1,4 - dioxo - 5 - (p - nitrophenyl) - 1,4,4a,5,8,8a - hexahydronaphthalene.

MOSES WOLF GOLDBERG.
WILLIAM EDWIN SCOTT.

REFERENCES CITED

The following references are of record in the file of this patent:

FOREIGN PATENTS

| Number | Country | Date |
| --- | --- | --- |
| 324,661 | Great Britain | Jan. 27, 1930 |

OTHER REFERENCES

Braude et al., J. Chem. Soc., 1947 volume, pp. 1087–96.

Bergmann et al., J. Organic Chem., vol. 12, pp. 57–66 (1947).